(12) United States Patent
Story

(10) Patent No.: US 9,193,227 B1
(45) Date of Patent: Nov. 24, 2015

(54) RELEASABLE SWING ARM CLAMP FOR A WHEEL SERVICING MACHINE

(75) Inventor: John Story, Murfreesboro, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 573 days.

(21) Appl. No.: 13/242,571

(22) Filed: Sep. 23, 2011

(51) Int. Cl.
| | |
|---|---|
| *B60C 25/135* | (2006.01) |
| *B60C 25/132* | (2006.01) |
| *B60C 25/05* | (2006.01) |
| *F16B 37/08* | (2006.01) |
| *B60C 25/138* | (2006.01) |

(52) U.S. Cl.
CPC .......... *B60C 25/132* (2013.01); *B60C 25/0563* (2013.04); *B60C 25/0593* (2013.01); *B60C 25/135* (2013.01); *B60C 25/138* (2013.01); *F16B 37/0821* (2013.01); *F16B 37/0885* (2013.01)

(58) Field of Classification Search
CPC .... B60C 25/05; B60C 25/132; B60C 25/135; B60C 25/138; B60C 25/0563; F16B 37/08; F16B 37/0821; F16B 37/0885
USPC ....................................................... 157/1.24
See application file for complete search history.

(56) References Cited

U.S. PATENT DOCUMENTS

| | | | | |
|---|---|---|---|---|
| 2,581,569 | A | * | 1/1952 | Zugaro et al. ................. 157/1.24 |
| 3,581,796 | A | * | 6/1971 | Alm .............................. 157/1.28 |
| 4,662,771 | A | | 5/1987 | Roe et al. |
| 4,693,656 | A | | 9/1987 | Guthrie |
| 4,787,794 | A | * | 11/1988 | Guthrie ......................... 411/433 |
| 4,809,759 | A | | 3/1989 | Dale et al. |
| 5,252,010 | A | | 10/1993 | Obrecht et al. |
| 5,381,843 | A | * | 1/1995 | Corghi ......................... 157/1.28 |
| 5,472,034 | A | * | 12/1995 | Corghi ......................... 157/1.24 |
| 6,056,034 | A | | 5/2000 | Matnick |
| 6,422,285 | B1 | * | 7/2002 | Gonzaga ...................... 157/1.24 |
| 6,523,799 | B2 | * | 2/2003 | Su ................................. 248/404 |

\* cited by examiner

*Primary Examiner* — Bryan R Muller
(74) *Attorney, Agent, or Firm* — Patterson Intellectual Property Law, P.C.; Mark J. Patterson

(57) ABSTRACT

A wheel servicing machine includes a releasable swing arm clamp apparatus attached to a swing arm. The clamp engages a rod slidably attached to and extending from a slide bar mounted on the swing arm. The clamp includes a closed, or locked, position and an open, or unlocked, position. In the closed position, the apparatus includes a rod clamp that can be rotated about the rod for fine adjustment of the angular position of the swing arm. When the rod clamp is in the open position, the angular position of the swing arm can be coarsely adjusted by manually moving the swing arm about a pivoting arm joint. When the swing arm is moved near a desired position, the rod clamp can be closed and can be rotated about the rod in the closed position in some embodiments for fine adjustment of the swing arm angular position.

13 Claims, 13 Drawing Sheets

RELEASABLE SWING ARM CLAMP FOR A WHEEL SERVICING MACHINE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to machinery and methods for servicing wheels and more particularly to wheel servicing machines having a pivotable swing arm for assisting in tire mounting or demounting operations.

Wheel servicing machines having a pivotable swing arm are known in the art. Such wheel servicing machines can include tire changing machines useful for assisting in the mounting and demounting of automobile tires on a wheel rim. Some conventional wheel servicing machines can include a swing arm pivotally attached to a support tower. The swing arm is angularly moveable relative to a machine base positioned below the swing arm. A tool head is positioned on the end of the swing arm. The tool head can be mounted on a moveable arm shaft and vertically adjusted for accommodating different sized wheels and tires. During use, the tool head must be angularly and vertically positioned relative to the wheel rim at a precise location for properly performing the wheel servicing operations.

Precise angular positioning of the tool head relative to the wheel rim is achieved in conventional wheel servicing machines by manually moving the swing arm relative to the wheel rim. The swing arm can be pivoted toward the wheel rim so that the tool head approaches and engages the wheel rim at the desired location. The wheel rim can then be rotated on the base while the tool head engages the wheel rim or tire. Following rotation of the wheel rim and desired engagement of the wheel rim or tire by the tool head, the swing arm can then be angularly moved away from the wheel rim by manually pushing the swing arm to the side using the operator's hand.

Some conventional wheel servicing machines include a flange protruding from the support tower near the swing arm. The flange includes a threaded flange passage and a threaded bolt extending through the flange passage having a distal bolt end protruding toward the swing arm. The opposite end of the threaded bolt includes a knob or handle for manually screwing or unscrewing the threaded bolt through the flange passage, thereby adjusting the axial position of the threaded bolt in the threaded flange passage. By turning the knob, the distal bolt end can be moved toward or away from the swing arm. The distal bolt end provides an angular stop position for the swing arm. When the swing arm is moved toward the wheel rim, the swing arm engages the threaded bolt and stops at the desired angular stop position defined by the bolt.

One problem associated with conventional threaded-bolt swing arm angular positioning assemblies occurs when wheel rims having different rim diameters are sequentially serviced using the same wheel servicing machine. For example, when a first wheel rim having a first rim diameter is positioned on the wheel servicing machine, the knob can be used to define an angular stop position associated with the first wheel diameter. Using the conventional configuration, the operator must use one hand to manually position the swing arm at the desired angular stop position and must use the other hand to turn the knob so that the threaded bolt contacts the swing arm. The swing arm angular stop position is thus defined by the bolt position, and the swing arm can be swung freely away from the bolt to provide clearance for loading and unloading subsequent wheel assemblies. The swing arm can subsequently be swung back to the same angular stop position defined by the bolt position. When a wheel having different dimensions is loaded on the machine, the angular stop position from the previous wheel must be reset to accommodate the new wheel dimensions. Thus, the user must readjust the bolt position by manually screwing the threaded bolt using the knob. This manual repositioning can involve numerous turns of the threaded bolt and can be time consuming. When repeated several times, the manual repositioning of the threaded bolt can reduce both worker efficiency and machine throughput. Additionally, repeated rotation of the knob by the operator to adjust the threaded bolt location can cause worker hand and arm fatigue and can contribute to worker injury. These problems are amplified when a single machine is used in a multiple-user environment such as a tire changing shop where numerous automobiles are serviced simultaneously.

What is needed, then, is an improved apparatus for adjusting the angular position of a swing arm on a wheel servicing machine. Additional improved methods of using the apparatus are also needed.

BRIEF SUMMARY OF THE INVENTION

One embodiment of the present invention provides a tire changing machine including a base and a support tower extending from the base. A swing arm is pivotally attached to the support tower. A releasable swing arm clamp, or a quick-release clamp, engages the swing arm. The releasable swing arm clamp includes an open position allowing angular movement of the swing arm relative to the base. The releasable swing arm clamp also includes a closed position preventing angular movement of the swing arm relative to the base.

Another embodiment of the present invention provides a wheel servicing apparatus including a base and a rotatable wheel support mounted on the base. A support tower is attached to the base, and a swing arm is pivotally attached to the support tower. A support flange is attached to the support tower. The support flange includes a flange plate defining a flange plate opening. The apparatus includes a rod having a first rod end attached to the swing arm and a second rod end extending through the flange plate opening. A rod clamp is releasably attached to the rod.

A further embodiment of the present invention provides a releasable swing arm clamp apparatus for mounting onto a swing arm of a wheel servicing machine. The apparatus includes a slide bar having a first bar end and a second bar end.

The slide bar includes a first mounting bracket disposed on the first bar end and a second mounting bracket disposed on the second bar end. A rod having a first bar end defining a travel socket is slidably disposed on the slide bar between the first and second bar ends. The rod has a second rod end extending away from the travel socket. The rod includes a threaded rod region.

In another embodiment, the present invention provides a tire changing apparatus having a support tower and a swing arm pivotally attached to the support tower. A support flange extends from the support tower, and a flange plate is pivotally attached to the support flange. The flange plate defines a flange plate opening. A rod has a first rod end attached to the swing arm and a second rod end slidably received in the flange plate opening.

Yet another embodiment of the present invention provides a method of adjusting the angular position of a swing arm on a wheel servicing machine. The method includes the steps of: (a) providing a wheel servicing machine including a support tower, a pivotable swing arm attached to the support tower including a rod extending from the swing arm, a flange extending from the support tower defining a flange plate opening shaped for receiving the rod and a clamp rotatably disposed about the rod adjacent the flange; (b) rotating the clamp relative to the rod; and (c) forcing the rod axially through the flange plate opening and angularly displacing the swing arm.

A further embodiment of the present invention provides a method of retrofitting a wheel servicing machine having a support tower and a swing arm to include a releasable swing arm clamp. The method includes the steps of: (a) providing a wheel servicing machine including a swing arm pivotally attached to the support tower, the support tower including a support flange protruding therefrom; (b) attaching a slide bar to the swing arm, the slide bar including a rod disposed thereon, the rod including a first rod end slidably attached to the slide bar and a second rod end extending from the slide bar generally toward the flange; (c) pivotally attaching a flange plate to the flange, the flange plate defining a flange plate opening shaped for receiving the rod; (d) inserting the rod through the flange plate opening; and (e) securing a releasable rod clamp to the rod adjacent the flange plate.

Numerous other objects, features and advantages of the present disclosure will be readily apparent to those skilled in the art upon a reading of the following description when taken in conjunction with the accompanying drawings.

DETAILED DESCRIPTION OF THE INVENTION

Figure 1:
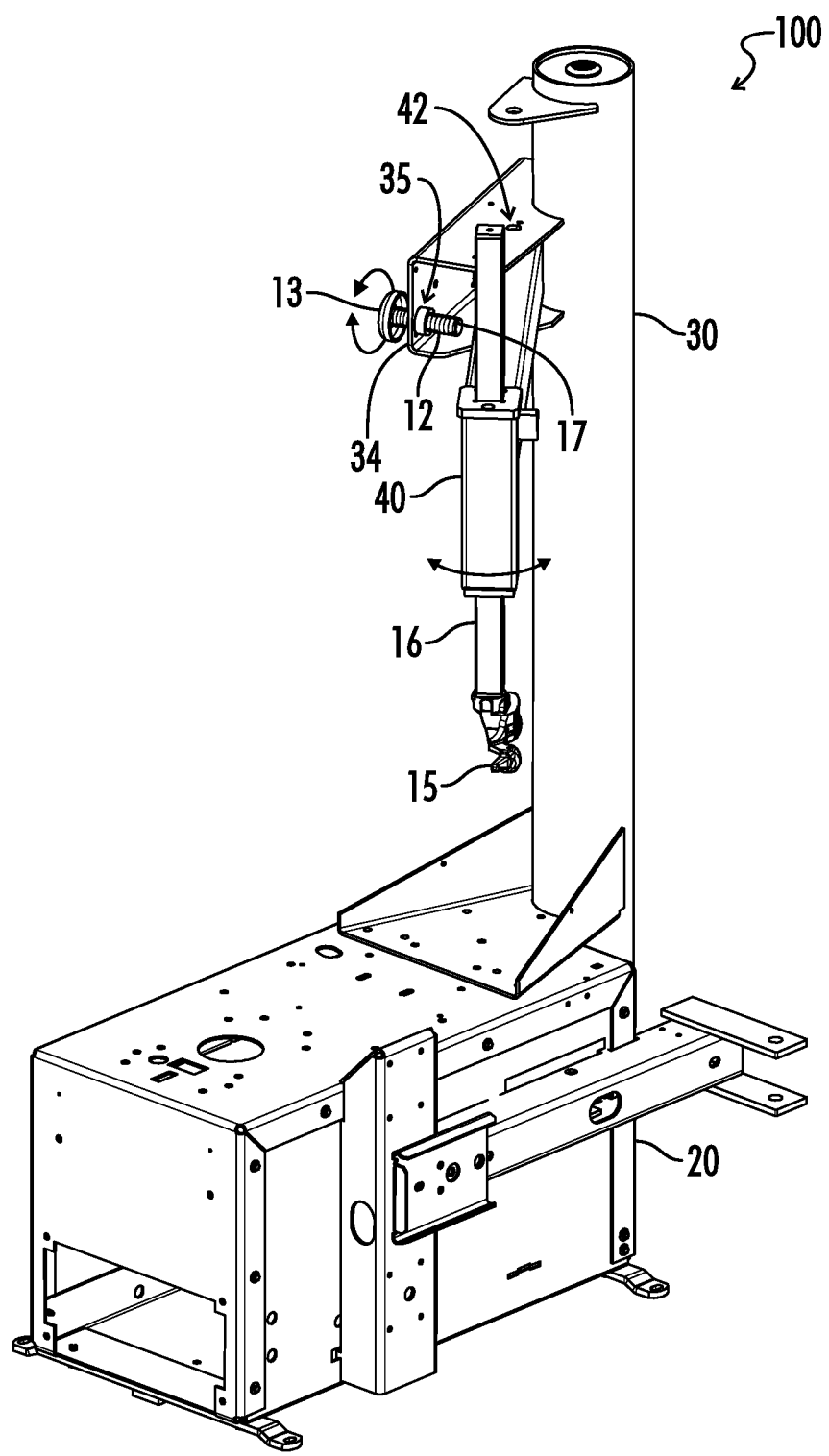
FIG. 1 illustrates a perspective view of an embodiment of a prior art wheel servicing machine having a threaded swing arm positioning rod.

Referring now to the drawings, FIG. 1 illustrates an embodiment of a conventional tire changing machine found in the prior art. The conventional tire changing machine 100 includes a base 20 and a support tower 30 extending from the base 20. Support tower 30 is illustrated in a vertical position, but it is understood that in some other embodiments support tower 30 can extend in an angled or horizontal orientation relative to base 20. The conventional tire changing machine 100 includes a swing arm 40 pivotally attached to support tower 30. In some embodiments, the conventional machine 100 includes a flange 34 extending from support tower 30. A control knob 13 can be attached to flange 34 for adjusting the angular position of swing arm 40 relative to support tower 30 and base 20. For example, in some conventional applications, a rotatable wheel holder is positioned on base 20, and a tire tool head 15 can extend downward from a tool shaft 16 attached to swing arm 40. During use, the tire tool 15 must be positioned relative to a wheel positioned on the rotatable wheel holder. Because swing arm 40 is pivotable relative to base 20, the angular position of tire tool head 15 can be adjusted by moving swing arm 40 relative to support tower 30.

As seen in FIG. 1, the conventional tire changing machine 100 includes a threaded rod 12 that extends through a rod passage 35 defined in the flange 34. The rod passage 35 includes passage threads that correspond to rod threads defined on rod 12. Distal rod end 17 extends beyond flange 34 toward swing arm 40 in the conventional embodiment seen in FIG. 1. Control knob 13 is attached to rod 12 and can be turned to adjust the position of rod 12 and distal rod end 17 relative to flange 34. When knob 13 is rotated in a first angular direction, rod 12 engages threaded rod passage 35, and distal rod end 17 moves toward swing arm 40. When knob 13 is rotated in the opposite angular direction, rod 12 engages threaded rod passage 35 in the opposite direction, and distal rod end 17 moves away from swing arm 40.

During use of the conventional machine 100 seen in FIG. 1, an operator can pivot the swing arm 40 from an initial swing arm position toward flange 34 until swing arm 40 contacts distal rod end 17. As such, distal rod end 17 defines a limit, or angular stop position, to the angular distance over which swing arm 40 can be moved toward flange 34. Upon contact between swing arm 40 and distal rod end 17, control knob 13 can be rotated as a fine angular adjustment of the angular position of swing arm 40 for precise alignment with the wheel. However, using the conventional machine 100 seen in FIG. 1, unscrewing the rod 12 away from swing arm 40 does not pull the swing arm toward the flange 34.

Figure 2A:
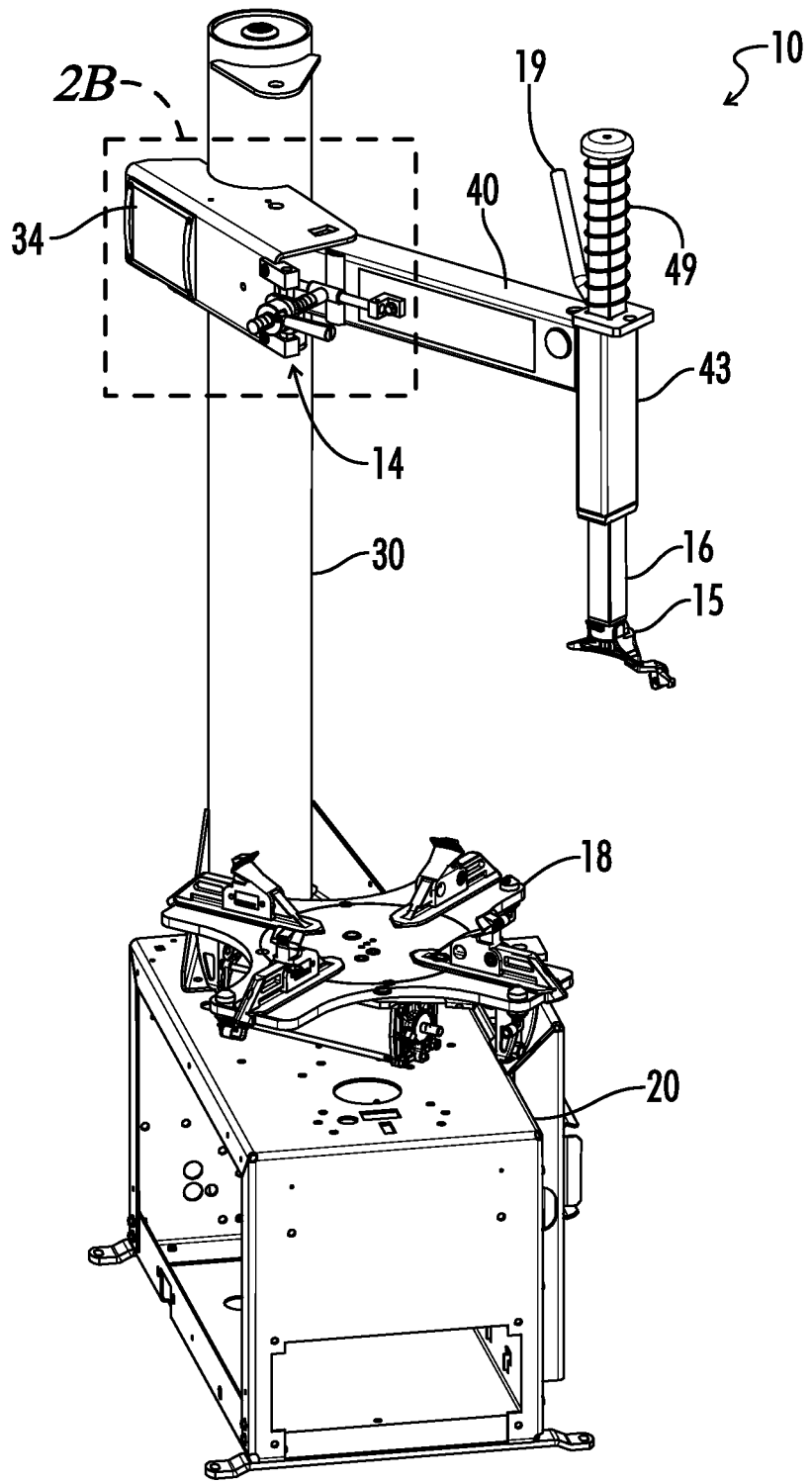
FIG. 2A illustrates a perspective view of an embodiment of a wheel servicing machine having a swing arm clamp in a closed position in accordance with the present invention.
Figure 3A:
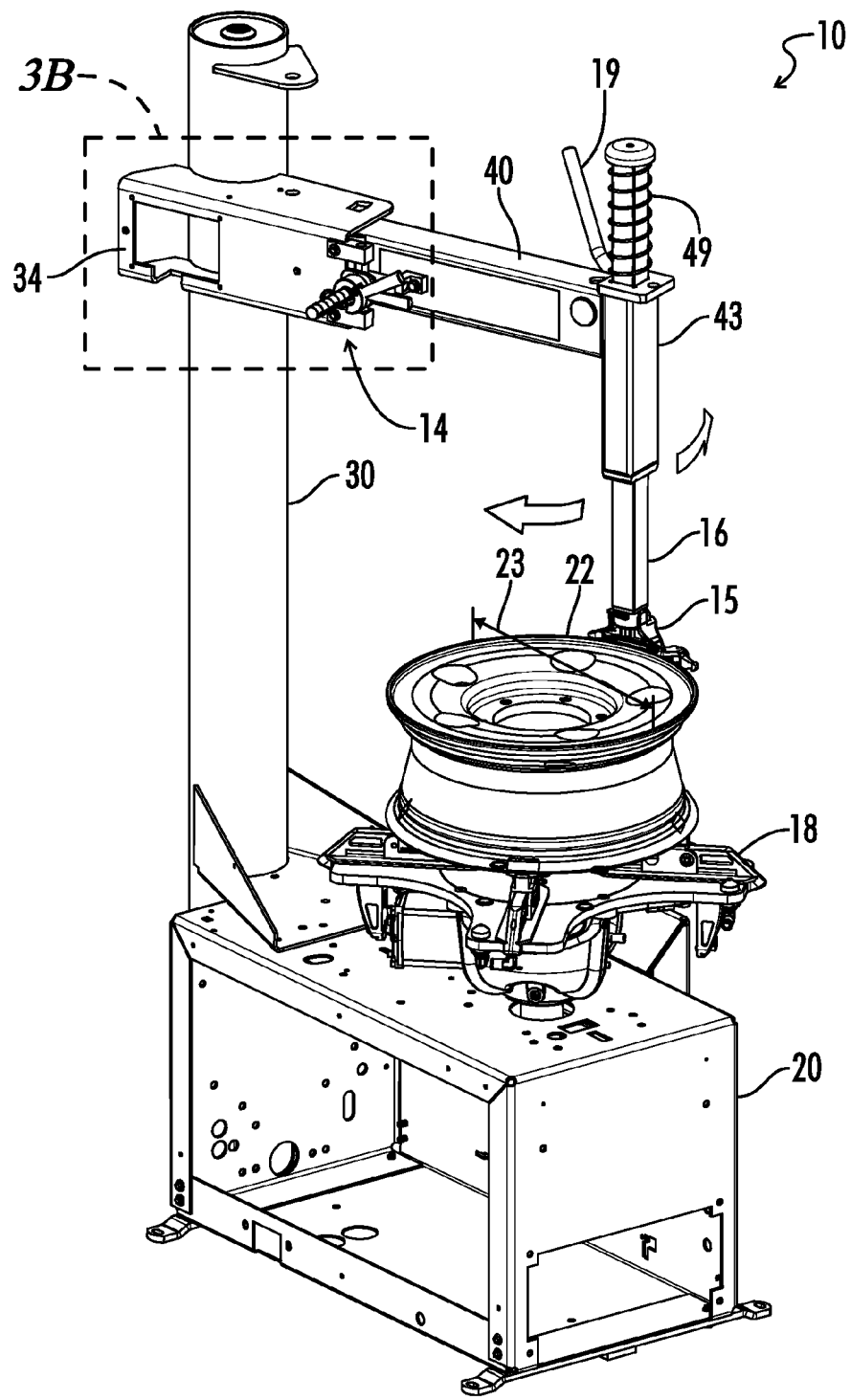
FIG. 3A illustrates a perspective view of an embodiment of a wheel servicing machine having a swing arm clamp in a partially open position in accordance with one aspect of the present invention.

Referring now to FIG. 2A, an embodiment of a wheel servicing machine 10 in accordance with the present invention is illustrated. Wheel servicing machine 10 can be a tire changing machine in some embodiments. The wheel servicing machine 10 includes a base 20 and a support tower 30 extending from the base 20. A swing arm 40 is pivotally attached to support tower 30. Also, the wheel servicing machine, or tire changing apparatus, 10 can include a vertically moveable tool head shaft 16 slidably disposed on the swing arm 40. A compression spring 49 can be disposed around the tool head shaft 16 for biasing the tool head shaft away from base 20. A shaft handle 19 can be mounted on swing arm 40 and operatively attached to tool head shaft 16 for selectively adjusting the vertical position of tool head 15. A rotatable wheel support 18, as seen in FIG. 3A, can extend from base 20. A wheel rim 22 having a wheel rim diameter 23 can be mounted on the rotatable support 18. A releasable swing arm clamp 14 engages swing arm 40 on wheel servicing machine 10 by providing a mechanical linkage between swing arm 40 and flange 34.

Swing arm clamp 14 generally has an open, or unlocked, position and a closed, or locked, position. In the closed position, the swing arm clamp 40 prevents angular movement of swing arm 40 relative to base 20. In the open position, the swing arm clamp 40 allows angular movement of swing arm 40 relative to base 20. A wheel servicing machine 10 having a swing arm clamp 14, as seen in FIG. 2A, is an improvement over the prior art wheel servicing machine 100 illustrated in FIG. 1 because wheel servicing machine 10 in accordance with the present invention includes a releasable swing arm clamp mechanism and allows fine angular adjustment of swing arm 40 toward and away from base 20.

Figure 2B:
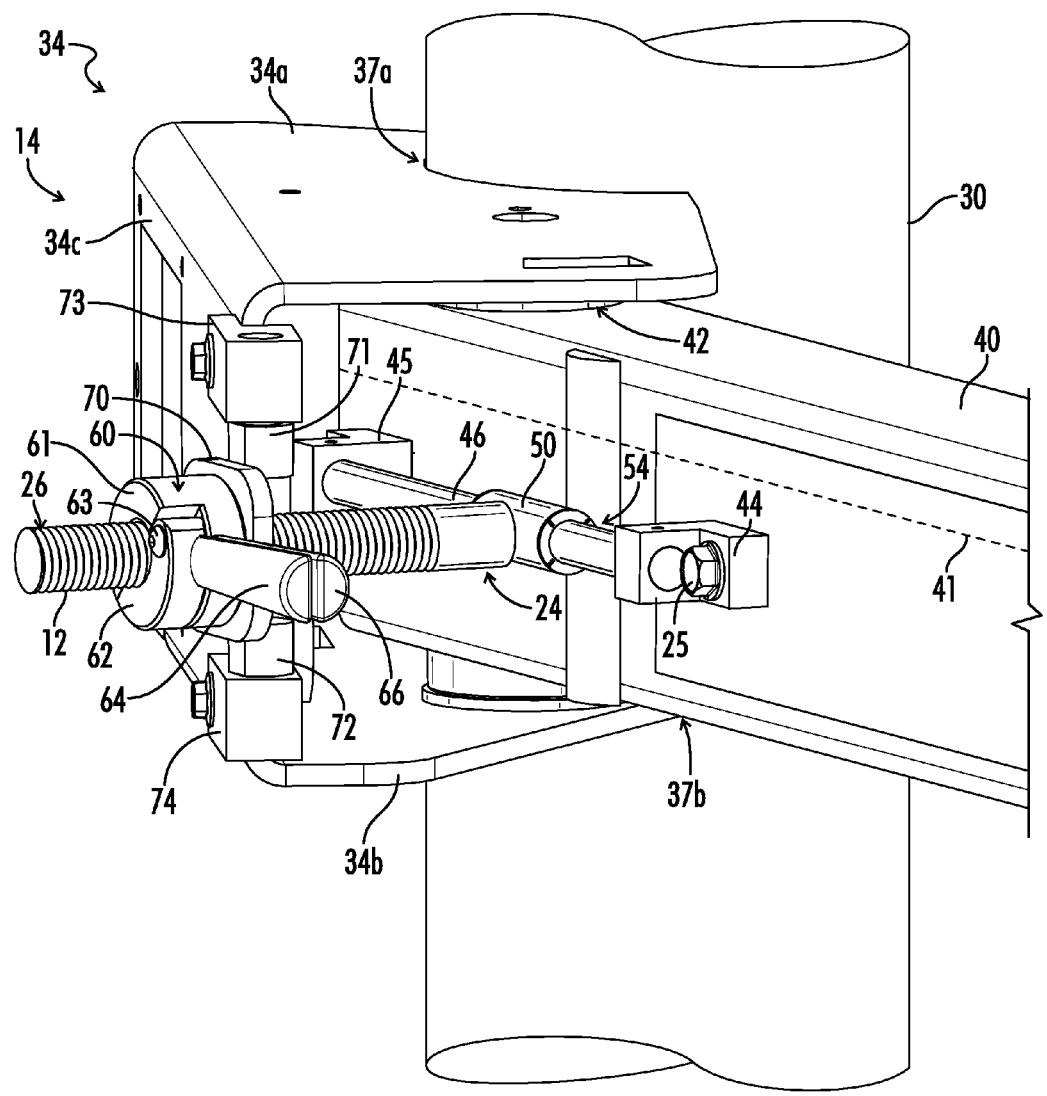
FIG. 2B illustrates a detail perspective view of an embodiment of the swing arm clamp of FIG. 2A in a closed position.

Referring now to FIG. 2B, an embodiment of swing arm clamp 14 attached to support tower 30 is illustrated in more detail. In some embodiments, swing arm clamp 14 is attached to support tower 30 by a support flange 34. Support flange 34 can include a metal plate attached to and extending from support tower 30. In some embodiments, the support flange 34 may be a U-shaped metal bracket having three sides, 34a, 34b, 34c, as seen in FIG. 2B. An upper flange plate 34a is attached to support tower 30 at a first flange connection 37a, and a lower flange plate 34b is attached to support tower at a second flange connection 37b below first flange connection 37a. Each flange connection 37a, 37b can be a weld or another type of suitable fastening means known in the art. A middle flange plate 34c can extend between upper and lower flange plates 34a, 34b. Flange 34 can be a stamped or pressed U-shaped metal bracket in some embodiments.

The present invention includes a rod 12 extending generally between support flange 34 and swing arm 40. The rod 12 in some embodiments may be a threaded metal rod having a substantially cylindrical profile. Rod 12 has a first rod end 24 attached to swing arm 40 and a second rod end 26 extending away from the swing arm 40. In some embodiments, a slide bar 46 is disposed on the swing arm 40. Slide bar 46 is attached to swing arm 40 and is oriented substantially parallel to the longitudinal swing arm axis 41 in some embodiments. Slide bar 46 can be offset from the swing arm 40 by a longitudinal gap 54 in some embodiments.

In some embodiments, slide bar 46 can be attached to swing arm 40 using first and second slide bar brackets. For example, slide bar 46 may have a first bar end extending generally away from support tower 30. First slide bar bracket 44 can be positioned on the first bar end. Similarly, slide bar 46 may include a second bar end extending generally toward support tower 30. A second slide bar bracket 45 can be positioned on second bar end. Each bar bracket 44, 45 can be secured to swing arm 40 using one or more mechanical fasteners or welds. In some embodiments, first and/or second bar brackets 44, 45 can be integrally formed on swing arm 40, or mechanically joined to swing arm 40, and slide bar 46 can be positioned between first and second bar brackets 44, 45. One or more bar bracket fasteners 25 can be used to secure each bar bracket to swing arm 40. In some embodiments, a conventional swing arm can be modified by forming holes in the swing arm and attaching a slide bar and first and second bar brackets to the swing arm using bar bracket fasteners 25.

Referring further to FIG. 2B, rod 12 has a first rod end 24 including a bar travel socket 50. Bar travel socket 50 can define a hollow sleeve shaped for slidably receiving slide bar 46. In some embodiments, bar travel socket 50 forms a union tee and is attached to rod 12. Bar travel socket 50 can be integrally formed on rod 12 in some embodiments. A roller bearing can be position in bar travel socket 50 between bar travel socket and slide bar 46. The roller bearing can rollingly engage slide bar 46 in some embodiments.

Swing arm 40 is pivotally attached to support tower 30. As seen in FIG. 2B, the swing arm 40 in some embodiments can be pivotally attached to support tower 30 at a pivoting arm joint 42 located between upper and lower flange plates 34a, 34b. The pivoting arm joint 42 in some embodiments may have one or more swing arm pins extending between flange 34 and swing arm 40. When swing arm 40 angularly rotates about pivoting arm joint 42, bar travel socket 50 can slide axially along slide bar 46.

As seen in the conventional embodiment in FIG. 1, rod 12 extends through a flange passage 35 defined in flange 34. Flange passage 35 in conventional designs includes a threaded passage defined in flange 34 and engaging corresponding threads defined on rod 12. One problem associated with the conventional machine 100 shown in FIG. 1 is that the engagement between flange passage 35 and rod 12 cannot be released, and axial positioning of rod 12 can only be accomplished by manually rotating rod 12 using knob 13. Such manual rotation can be time consuming and inefficient.

A wheel servicing machine 10 in accordance with the present invention, as seen in an embodiment in FIG. 2B, solves this problem by providing a rod clamp 60 releasably engaging rod 12. Rod clamp 60 includes a clamp body 61 and a releasable clamp member 62 pivotally attached to clamp body 61 at a pivoting clamp joint 63. Releasable clamp member 62 can be pivoted about pivoting clamp joint 63 away from clamp body 61. Clamp body 61 includes an axial clamp bore through which rod 12 slidably extends.

The rod clamp 60 generally has at least two positions. A first or closed position of rod clamp 60 is seen in FIG. 2B. In the closed position, releasable clamp member 62 engages rod 12. More specifically, releasable clamp member 62 has a threaded clamp region that selectively engages corresponding threads on rod 12 when rod clamp 60 is in the closed position.

Figure 3B:
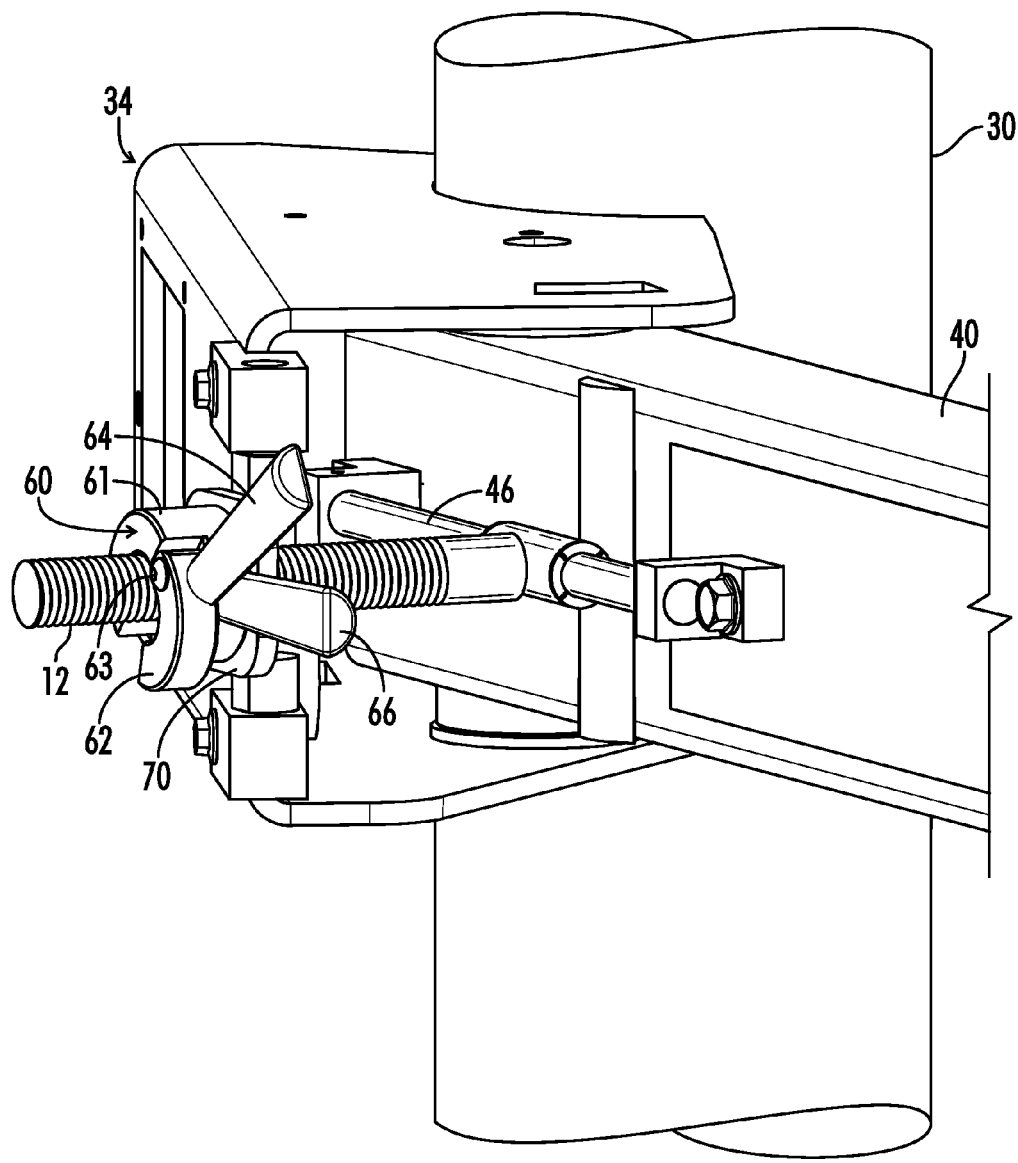
FIG. 3B illustrates a detail perspective view of an embodiment of the swing arm clamp of FIG. 3A in a partially open position.

As seen in FIG. 2B, rod clamp 60 can include first and second clamp handles 64, 66. First clamp handle 64 extends radially from releasable clamp member 62 and second clamp handle 66 extends radially from clamp body 61. First and second clamp handles 64, 66 can be used to manually open and close rod clamp 60. For example, as seen in FIG. 3A and FIG. 3B, first handle 64 can be moved angularly away from second handle 66 to move rod clamp 60 to the open position. Movement of first handle 64 away from second handle 66 causes releasable clamp member 62 to pivot about pivoting clamp joint 63 away from rod 12, thereby moving rod clamp 60 to an open position and disengaging the clamp threads from the rod threads. Similarly, from the position seen in FIG. 3A and FIG. 3B, first and second clamp handles 64, 66 can be angularly moved toward each other, causing releasable clamp member 62 to move toward and engage rod 12, thereby putting rod clamp 60 in the closed position, as seen in FIG. 2A and FIG. 2B. While the embodiment seen in FIG. 2B includes first and second clamp handles 64, 66 angularly aligned in the closed position, it will be readily appreciated that, in other embodiments not shown, first and second clamp handles 64, 66 can be angularly offset when rod clamp 60 is in the closed position.

During use, swing arm 40 can be angularly positioned in at least two modes. First, swing arm 40 can be angularly moved manually with the rod clamp 60 in the open position. Angular movement of swing arm 40 with rod clamp 60 in the open position is considered free, or coarse, positioning because rod clamp 60 does not threadedly engage rod 12. Second, swing arm 40 can be angularly moved with the rod clamp 60 in the closed position, also referred to as restricted, or fine, positioning because clamp 60 does threadedly engage rod 12, thereby limiting the angular movement of swing arm 40.

Referring now to FIGS. 4A-6B, movement of swing arm 40 in a first mode with an embodiment of rod clamp 60 in an open position is generally illustrated in a partially broken away plan view. Starting in FIG. 4A, the swing arm 40 begins at an initial angular swing arm position 40', and handle member 68 (including first and second handles clamp 64, 66) is in the open position. As seen in FIG. 4B, the bar travel socket attached to rod 12 begins at an initial bar travel socket position 50'.

Figure 5A:
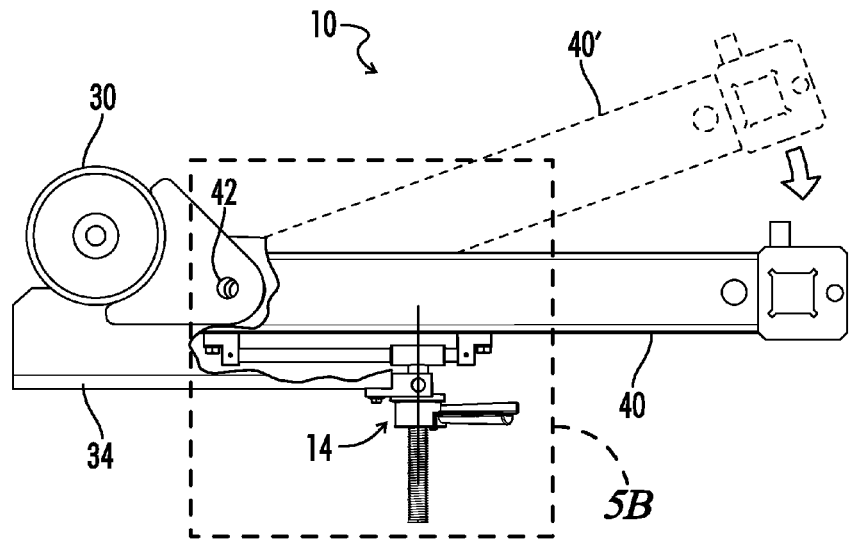
FIG. 5A illustrates a partially broken away plan view of an embodiment of a wheel servicing apparatus including a releasable swing arm clamp in accordance with the present invention.
Figure 5B:
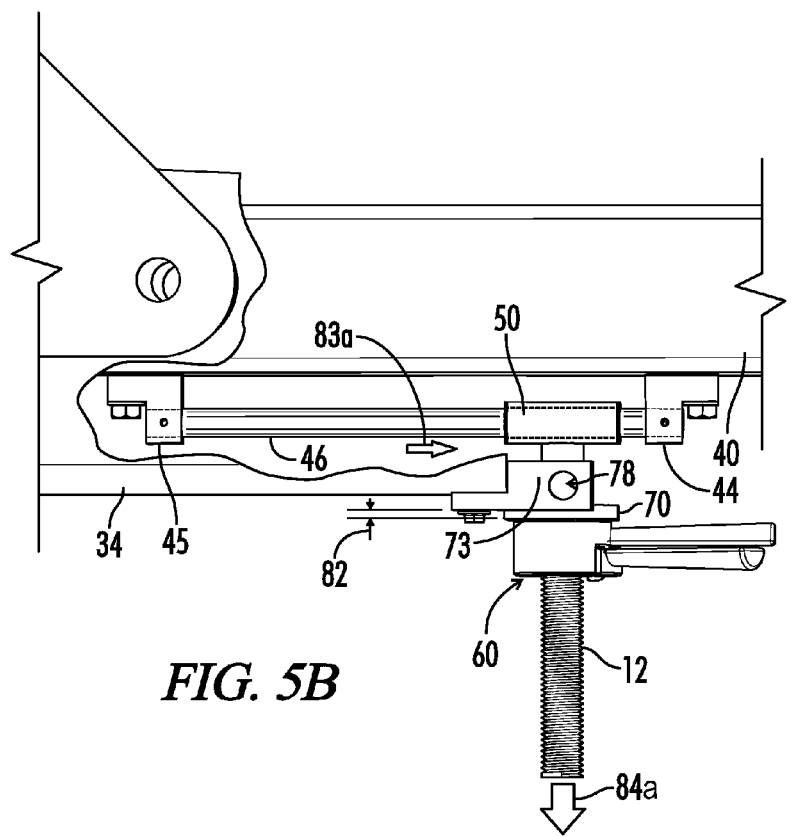
FIG. 5B illustrates a partially broken away detail plan view of the embodiment of a wheel servicing apparatus of FIG. 5A.

From the initial position 40' seen in FIGS. 5A and 5B, swing arm 40 can be moved in a first angular direction generally toward the wheel rim (not shown). This type of movement of swing arm 40 is generally referred to as a coarse adjustment because rod clamp 60 is disengaged from rod 12, allowing swing arm 40 to move freely about pivoting arm joint 42. When swing arm 40 is moved in this direction, rod 12 extends through a center aperture in rod clamp 60, as indicated by rod arrow 84a. Bar travel socket 50 also slidably engages slide bar 46 and moves toward first bar bracket 44, away from pivoting arm joint 42, as indicated by socket arrow 83a in FIG. 5B.

Figure 4A:
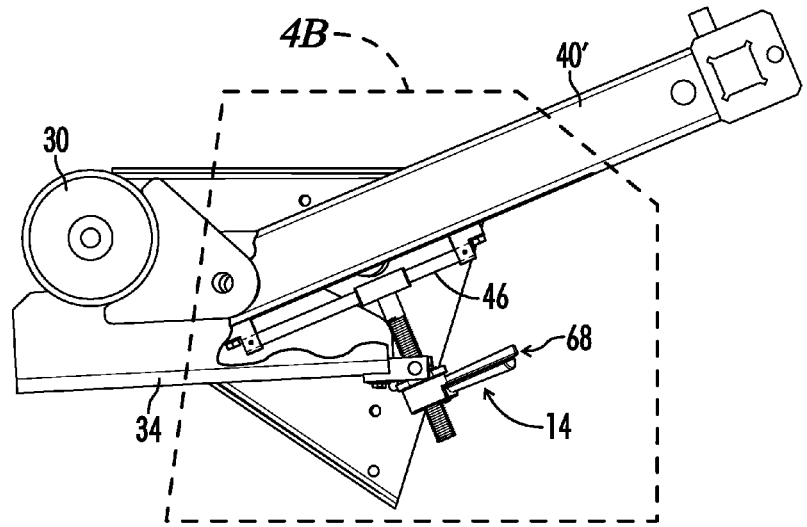
FIG. 4A illustrates a partially broken away plan view of an embodiment of a wheel servicing machine including a releasable swing arm clamp in an open position in accordance with the present invention.
Figure 4B:
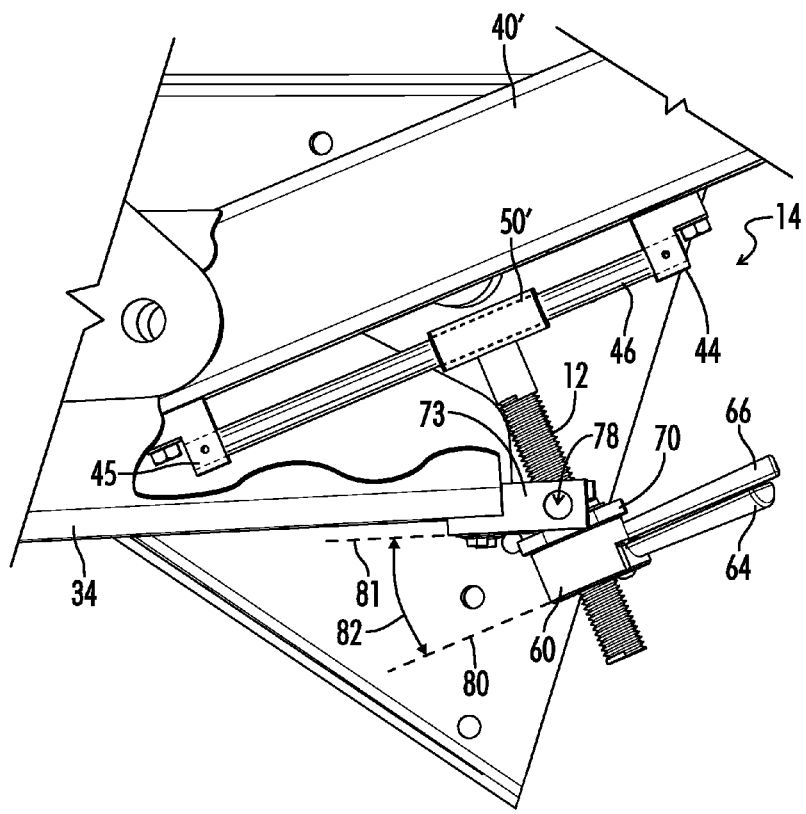
FIG. 4B illustrates a partially broken away detail plan view of an embodiment of the swing arm clamp of FIG. 4A in an open position.

One feature found in some embodiments of the present invention is a pivotable flange plate attached to the support flange extending from the support tower. As seen in FIG. 4B, flange plate 70 includes a flange plate axis 80 oriented substantially parallel to the flange plate surface. Similarly, flange 34 includes a flange axis 81 oriented substantially parallel to the flange surface. A flange plate angle 82 is defined as the angle between the flange plate axis 80 and the flange axis 81. Flange axis 81 is aligned substantially parallel to flange 34 adjacent flange plate. The flange plate angle 82 is generally acute, as seen in FIG. 4B. When swing arm 40 is moved toward flange 34, in some embodiments, flange plate 70 pivots, or rotates, about pivoting flange plate joint 78. As seen in FIG. 5B, as swing arm 40 approaches flange 34, the flange plate angle 82 becomes smaller and approaches zero.

Figure 9:
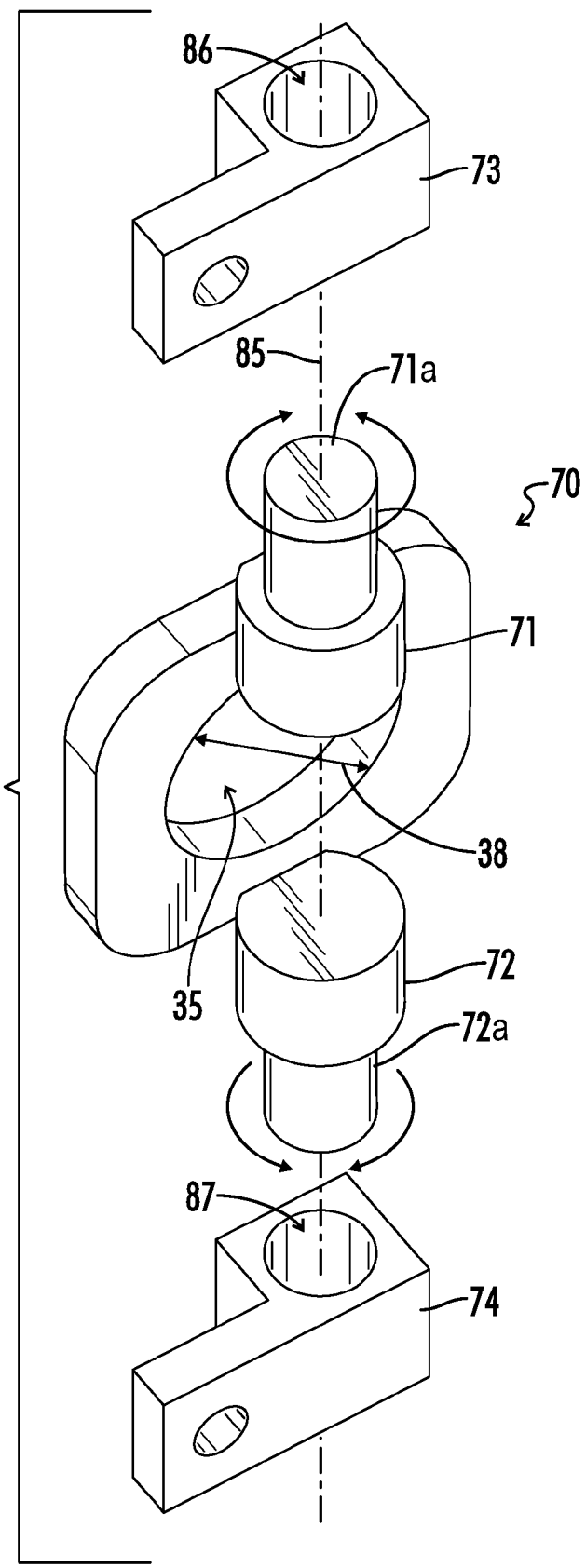
FIG. 9 illustrates a perspective exploded view of an embodiment of a flange plate assembly in accordance with the present invention.

Rotation of flange plate 70 is influenced by the passage of rod 12 through the flange plate opening 35, seen in FIG. 9. Referring further to FIG. 9 and to FIG. 2B, flange plate 70 generally includes a first flange plate bracket 71. In some embodiments, flange plate 70 may include a second flange plate bracket 72. In other embodiments, flange plate 70 has only one flange plate bracket. Flange plate 70 may be attached to flange 34 at one or more pivoting attachment points. For example, the flange plate 70 illustrated in FIG. 9 has a first flange plate bracket 71 and a second flange plate bracket 72. A first bracket pin 71a extends from first flange plate bracket 71 away from flange plate 70, and a second bracket pin 72a extends from second flange plate bracket 72 away from flange plate 70. It will be readily appreciated by those of skill in the art that flange plate 70 can be integrally formed with first and second flange plate brackets 71, 72. In other embodiments, first and second flange plate brackets 71, 72 can be separate pieces fastened to flange plate 70 using one or more fasteners or welds.

Additionally, as seen in FIG. 9, flange plate pivot axis 85 defines an axis about which flange plate 70 pivots. Flange plate pivot axis 85 can be laterally aligned with the center of flange plate opening 35. In other embodiments, flange plate pivot axis 85 can be laterally offset from flange plate opening 35, as seen in FIG. 9. Also seen in FIG. 9, flange plate opening 35 defines a flange plate opening diameter 38. Flange plate opening diameter 38 is larger than the local diameter of rod 12 passing through flange plate opening 35.

In some embodiments, flange plate 70 is not secured directly to flange 34, but is instead pivotally attached to one or more flange plate supports 73, 74, seen in FIG. 2B and FIG. 9. Each flange plate support 73, 74 can be integrally formed on flange 34 or can be formed of a separate member that is attached to flange 34 using one or more fasteners or welds. First flange plate support 73 is pivotally attached to first flange plate bracket 71, and second flange plate support 74 is pivotally attached to second flange plate bracket 72. In some embodiments, first flange plate support 73 defines a first pin hole 86 shaped for receiving first bracket pin 71a, and second flange plate support 74 defines a second pin hole 87 shaped to receive second bracket pin 72a. Each flange plate support 73, 74 is rigidly attached to flange 34 or integrally formed on flange 34.

Figure 6A:
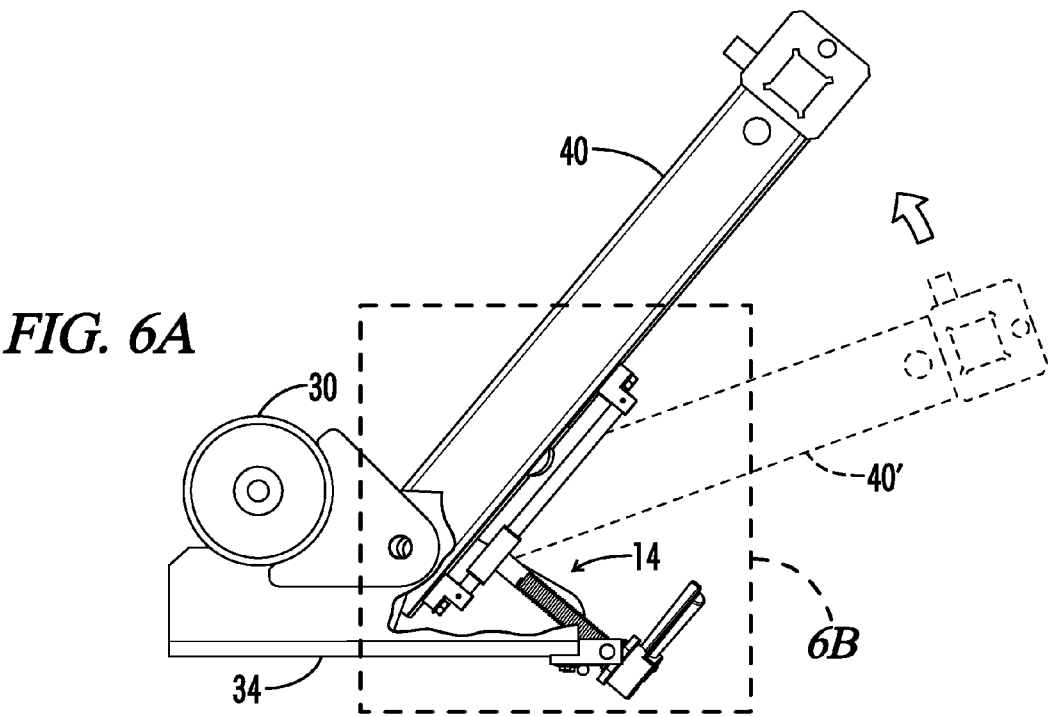
FIG. 6A illustrates a partially broken away plan view of an embodiment of a wheel servicing apparatus including a releasable swing arm clamp in accordance with the present invention.
Figure 6B:
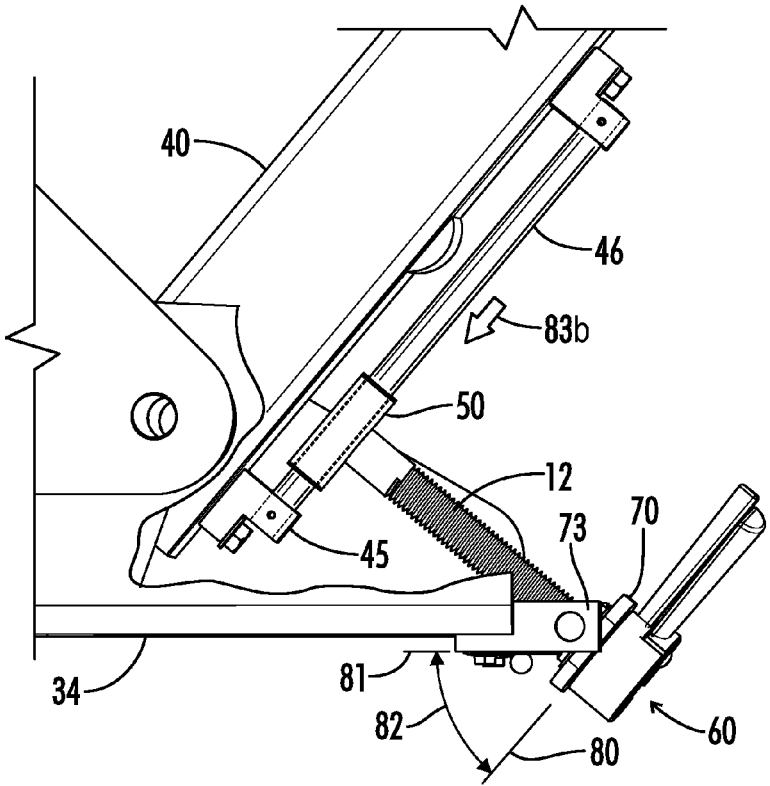
FIG. 6B illustrates a partially broken away detail plan view of the embodiment of a wheel servicing apparatus of FIG. 6A.

Referring now to FIGS. 6A and 6B, when rod clamp 60 is in the open position, swing arm 40 can be moved in a second angular direction opposite the first angular direction generally away from the wheel rim (not shown). In this embodiment, bar travel socket 50 generally slides along slide bar 46 toward second bar bracket 45 as swing arm 40 pivots away from flange 34, as indicated by arrow 83b. As bar travel socket 50 moves, rod 12 is pulled away from rod clamp 60, as seen in FIG. 6B. As rod 12 moves, flange plate 70 is able to rotate relative to flange 34, causing the flange plate angle 82 to increase.

During use, an operator can generally perform a wheel servicing operation with the rod clamp in the closed position, as seen in FIG. 2B. After the wheel servicing operation is complete, rod clamp 60 can be moved to the open position, or released, and swing arm 40 can be moved angularly away from the wheel rim as seen in FIG. 6A. A new wheel rim can be mounted on the wheel servicing machine, and then swing arm 40 can be freely moved toward the new wheel rim with rod clamp 60 still in the open position, as seen generally in FIG. 5A. Rod clamp 60 can then be locked at or near the desired swing arm angular position by engaging rod 12 with releasable clamp member 62. Additional fine adjustment of the swing arm angular position in either angular direction can be achieved by further rotating rod clamp 60 in the closed position.

In some applications, swing arm 40 can be moved toward a wheel rim with rod clamp 60 in the open position as a coarse adjustment. However, after rod clamp 60 is closed, a more fine adjustment of swing arm 40 toward or away from the wheel rim may be desired. Such fine adjustment can be achieved in some embodiments of the present invention by rotating the rod clamp 60 about rod 12 with releasable member 62 in the closed position. In some embodiments, when handle 68 and rod clamp 60 are rotated about rod 12, threads on releasable clamp member 62 engage corresponding threads on rod 12, thereby axially pushing or pulling rod 12 relative to swing arm 40.

Figure 7:
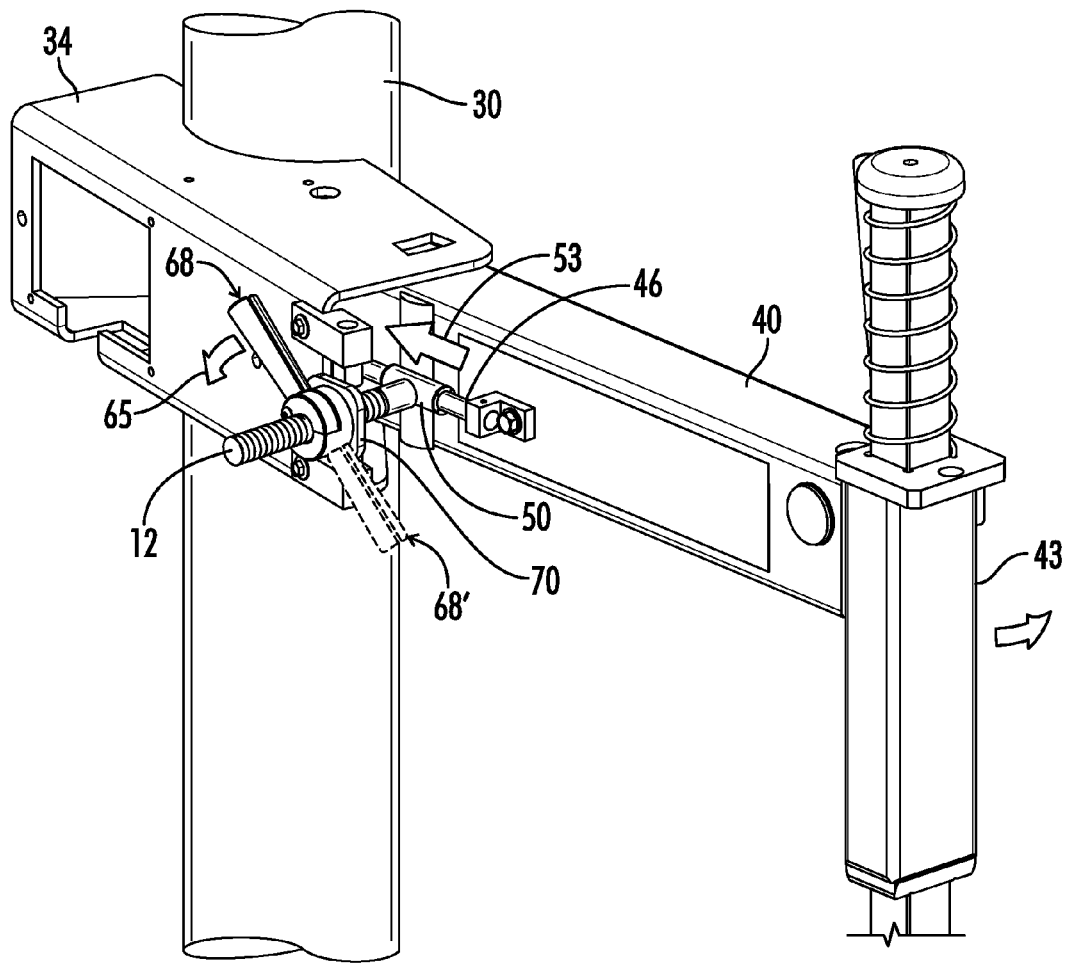
FIG. 7 illustrates a perspective view of an embodiment of a wheel servicing machine showing fine adjustment of angular swing arm position in a first angular direction by rotating the rod clamp.
Figure 8:
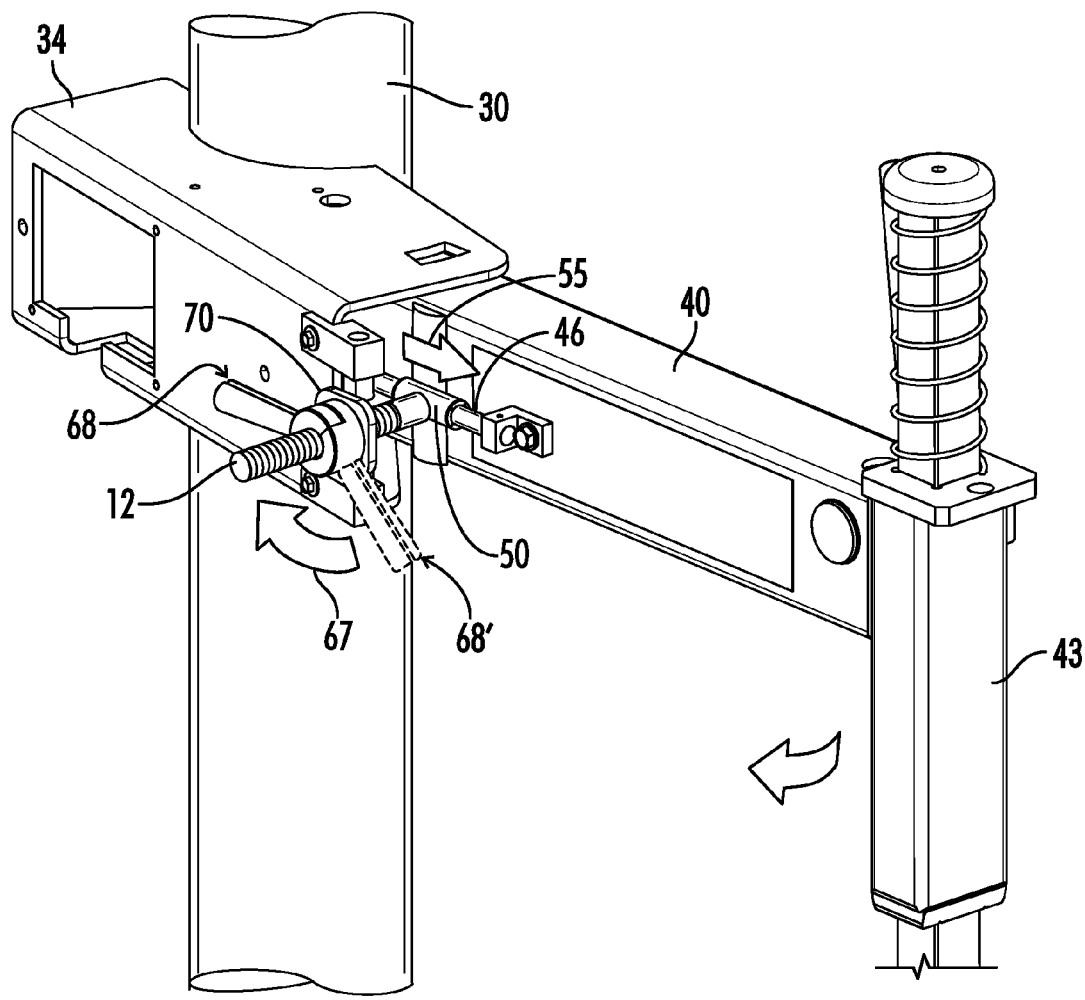
FIG. 8 illustrates a perspective view of an embodiment of the wheel servicing machine of FIG. 7 showing fine adjustment of angular swing arm position in a second angular direction by rotating the rod clamp.

For example, referring to FIG. 7 and FIG. 8, in some embodiments, the handle 68 begins at an initial handle position 68' and rod clamp 60 can begin at a first angular clamp position relative to rod 12 with clamp 60 in the closed position. As seen in FIG. 7, in some embodiments, the angular position of swing arm 40 can be finely adjusted by rotating handle 68 and rod clamp 60 about rod 12 in a first clamp rotation direction 65 such that clamp threads on clamp 60 engage corresponding rod threads on rod 12 and push rod 12 axially toward swing arm 40. Simultaneously, bar travel socket 50 may move slightly generally toward support tower 30, as indicated by arrow 53.

As seen in FIG. 7, when rod 12 is pushed in a direction toward swing arm 40, swing arm 40 pivots about pivoting arm joint 42 and moves away from flange 34, and correspondingly away from a wheel rim mounted on wheel servicing machine below swing arm 40. Simultaneously, bar travel socket 50 may move slightly toward support tower 30, as indicated by arrow 53. For each rotation of clamp 60 about rod 12, the swing arm 40 in some embodiments will move a relatively small angular distance. For example, in some embodiments, a full rotation of clamp 60 about rod 12 will cause swing arm 40 to move an angular distance between about 0.1 degrees and about twenty degrees. The angular distance swing arm 40 moves in response to rotation of clamp 60 can depend on several variables, including the rod thread configuration on rod 12, the clamp thread configuration on releasable member 62, flange plate angle 82, and/or the initial angular position of swing arm 40.

Referring to FIG. 8, when handle 68 and clamp 60 are rotated in a second clamp rotation direction 67 about rod 12, rod 12 is moved in the opposite axial direction and is pulled in the direction away from swing arm 40 toward flange 34. In this application, swing arm 40 moves angularly toward flange 34 and the wheel rim (not shown). Thus, by rotating handle 68 and rod clamp 60, the angular position of swing arm 40 can be finely adjusted relative to the wheel rim. A user can thus use handle 68 to finely adjust the angular position of swing arm 40 in either angular direction simply by rotating clamp 60 about rod 12 while releasable clamp member 62 remains in the closed, or locked, position.

In some embodiments, the present invention provides a method of adjusting the angular position of a swing arm on a wheel servicing machine. The method includes the steps of: (a) providing a wheel servicing machine including a support tower, a pivotable swing arm attached to the support tower including a rod extending from the swing arm, a flange extending from the support tower, a flange plate attached to the flange defining a flange plate opening shaped for receiving the rod and a releasable rod clamp rotatably disposed about the rod adjacent the flange plate; (b) rotating the rod clamp about the rod; (c) forcing the rod axially through the flange plate opening; and (d) angularly displacing the swing arm.

The method in some embodiments may include the additional steps of: (e) releasing the engagement between the clamp and the swing arm; and (f) manually pivoting the swing arm relative to the support tower. In some embodiments, step (e) includes pivoting a releasable clamp member relative to a clamp base.

In many applications, it is desirable to retrofit, or modify, a conventional wheel servicing machine or tire changing machine to include a releasable swing arm clamp in accordance with the present invention. One aspect of the present invention provides an apparatus that can be installed onto a conventional wheel servicing machine to provide enhanced angular positioning of the swing arm. For example, in some embodiments, the present invention may include a slide bar 46 having a first bar bracket 44 and a second bar bracket 45. Each bar bracket 44, 45 can be secured to a conventional swing arm using one or more fasteners or welds. The apparatus also includes a bar travel socket slidably engaging slide bar 46. Bar travel socket 50 is attached to a rod 12 having a threaded rod region. A flange plate 70 is included in the kit. Flange plate 70 defines a flange plate opening shaped for receiving rod 12 and includes first and second flange plate brackets 71, 72. Each flange plate bracket 71, 72 can be pivotally attached to first and second flange plate supports 73, 74 included in the kit. Each flange plate support 73, 74 can be rigidly attached to a support tower or support tower flange using mechanical fasteners or welds. A rod clamp 60 having a releasable member 62 is included in the kit and is adapted to be releasably positioned on rod 12. It will be readily appreciated that in some alternative embodiments first and second flange plate brackets can include holes shaped to receive pins protruding from first and second flange plate supports, respectively.

Figure 10A:
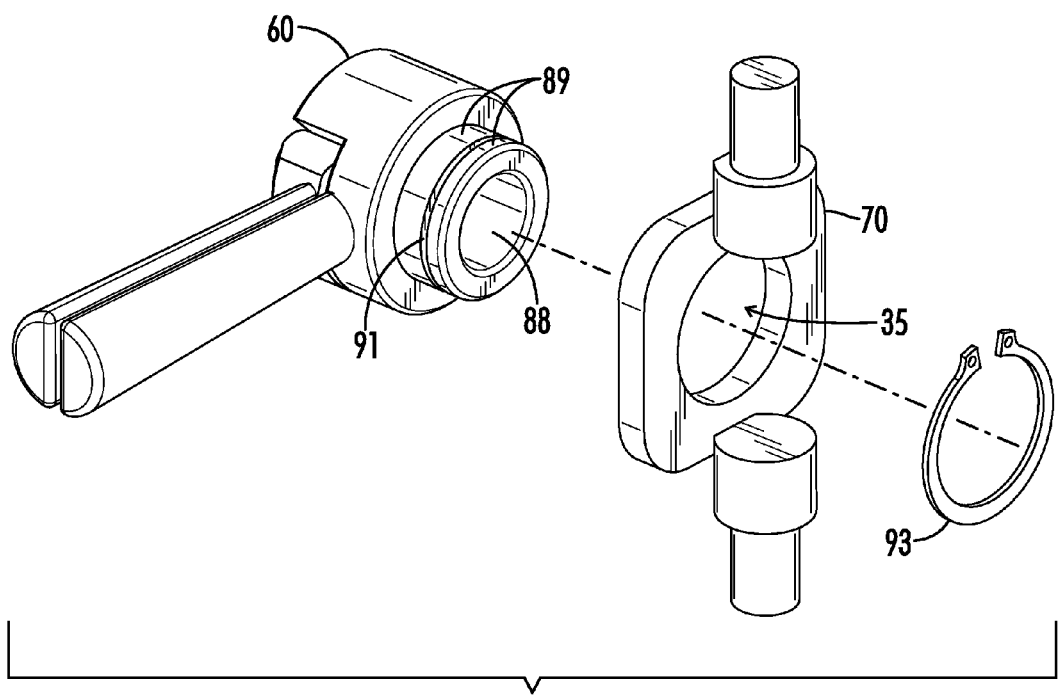
FIG. 10A illustrates an exploded perspective view of an embodiment of a flange plate assembly including a clamp and clamp retaining structure.
Figure 10B:
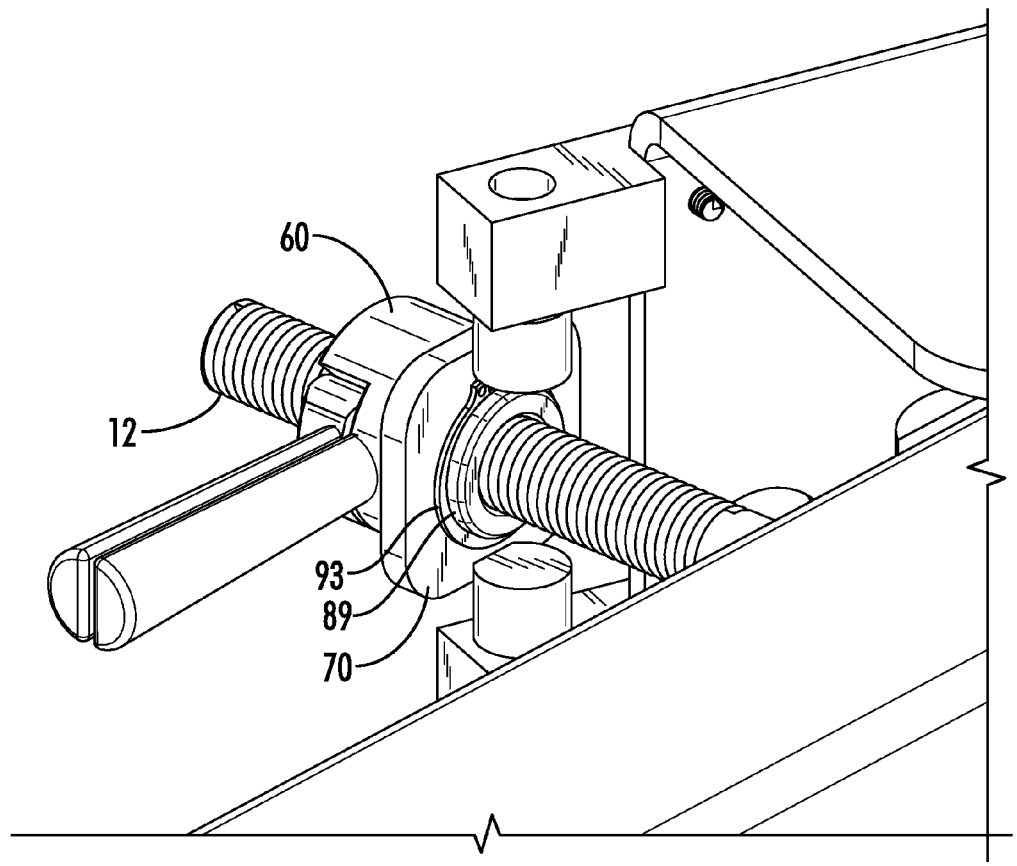
FIG. 10B illustrates a perspective view of an embodiment of a flange plate assembly including a clamp rotatably secured to a flange plate by a retaining structure.

Referring now to FIG. 10A, in some embodiments, a releasable clamp 60 includes an annular clamp flange 89 protruding outward from the clamp 60 surrounding clamp opening 88. Threaded rod 12 is generally received in clamp opening 88. The annular clamp flange 89 has a smaller diameter than the outer diameter of clamp 60, thus forming a shoulder on clamp 60. The annular clamp flange 89 can be received through flange opening 35 on flange plate 70. A retaining structure 93 can be secured to the portion of clamp flange 89 protruding through flange opening 35. Retaining structure 93 in some embodiments includes a clamp ring 93 as seen in FIG. 10A. In other embodiments, various other retaining structures 93 can engage annular clamp flange 89 to pivotally secure clamp 60 to flange plate 70. Retaining structure 93 generally has an outer dimension larger than flange opening 35 such that clamp ring 93 contacts flange 70 and prevents clamp 60 from disengaging from flange plate 70 when clamp 60 is rotated. In some embodiments, an annular groove 91 is defined in annular clamp flange 89, and retaining structure 93 is received in annular groove 91, as seen in FIG. 10B.

In a further embodiment, the present invention provides a method of retrofitting a wheel servicing machine to include a releasable swing arm positioning assembly, or a releasable swing arm clamp. The method includes the steps of: (a) providing a wheel servicing machine including a swing arm pivotally attached to a support tower, the support tower including a flange protruding therefrom; (b) attaching a slide bar to the swing arm, the slide bar including a rod disposed thereon, the rod including a first rod end slidably attached to the slide bar and a second rod end extending from the slide bar generally toward the flange; (c) pivotally attaching a flange plate to the flange, the flange plate defining a flange plate opening shaped for receiving the rod; (d) inserting the rod through the flange plate opening; and (e) securing a releasable rod clamp to the rod adjacent the flange plate.

Thus, although there have been described particular embodiments of the present invention of a new and useful Releasable Swing Arm Clamp for a Wheel Servicing Machine, it is not intended that such references be construed as limitations upon the scope of this invention except as set forth in the following claims.

What is claimed is:

1. A wheel servicing apparatus, comprising:
a base;
a rotatable wheel support mounted on the base;
a support tower extending from the base;
a swing arm pivotally attached to the support tower;
a support flange attached to the support tower, the support flange including a flange plate defining a flange plate opening;
a rod having a first rod end attached to the swing arm and a second rod end extending through the flange plate opening; and
a rod clamp releasably attached to the rod and rotatable relative to the rod;
a clamp base defining a clamp opening;
a releasable clamp member pivotally attached to the clamp base, the releasable clamp member including a threaded clamp region;
a first handle disposed on the clamp base and a second handle disposed on the releasable clamp member, wherein the first and second handles extend radially from the rod clamp and are angularly aligned when the rod clamp is in a closed position;
the swing arm defines a longitudinal swing arm axis; and
a slide bar attached to the swing arm oriented substantially parallel to the longitudinal swing arm axis, the slide bar being offset from the swing arm by a bar gap.

2. The apparatus of claim 1, wherein the rod clamp is disposed on the support flange and the rod clamp is angularly moveable relative to the support flange.

3. The apparatus of claim 1, further comprising:
the rod includes rod threads;
the rod clamp is rotatable about the rod when the rod clamp is in the closed position; and
the releasable clamp member threadedly engages the rod threads when the rod clamp is rotated about the rod in the closed position.

4. The apparatus of claim 1, further comprising:
the rod clamp having an open position and a closed position attached to the flange plate; and
wherein the rod is axially moveable through the flange plate opening when the rod clamp is in the open position.

5. A wheel servicing apparatus, comprising:
a base;
a rotatable wheel support mounted on the base;
a support tower extending from the base;
a swing arm pivotally attached to the support tower;
a support flange attached to the support tower, the support flange including a flange plate defining a flange plate opening;
a rod having a first rod end attached to the swing arm and a second rod end extending through the flange plate opening;
a rod clamp releasably attached to the rod and rotatable relative to the rod;
a clamp base defining a clamp opening;
a releasable clamp member pivotally attached to the clamp base, the releasable clamp member including a threaded clamp region;
a first handle disposed on the clamp base; and
a second handle disposed on the releasable clamp member; and, wherein the first and second handles extend radially from the rod clamp and are angularly aligned when the rod clamp is in a closed position.

6. A wheel servicing apparatus, comprising:
a base;
a rotatable wheel support mounted on the base;
a support tower extending from the base;
a swing arm pivotally attached to the support tower;
a support flange attached to the support tower, the support flange including a flange plate defining a flange plate opening;
a rod having a first rod end attached to the swing arm and a second rod end extending through the flange plate opening;
a rod clamp releasably attached to the rod and rotatable relative to the rod;
a clamp base defining a clamp opening;
a releasable clamp member pivotally attached to the clamp base, the releasable clamp member including a threaded clamp region;
the flange plate is pivotally attached to the flange; and
the flange plate is pivotable relative to the flange when the rod passes through the flange plate opening.

7. The apparatus of claim 6, wherein the rod clamp longitudinally forces the threaded rod through the flange plate opening when the rod clamp is rotated in the closed position.

8. A wheel servicing apparatus, comprising:
a base;
a rotatable wheel support mounted on the base;
a support tower extending from the base;
a swing arm pivotally attached to the support tower;
a support flange attached to the support tower, the support flange including a flange plate defining a flange plate opening;
a rod having a first rod end attached to the swing arm and a second rod end extending through the flange plate opening;
a rod clamp releasably attached to the rod and rotatable relative to the rod;
the swing arm defines a longitudinal swing arm axis; and
a slide bar attached to the swing arm oriented substantially parallel to the longitudinal swing arm axis, the slide bar being offset from the swing arm by a bar gap.

9. The apparatus of claim 8, further comprising:
a travel socket slidably disposed on the slide bar, the travel socket being attached to the rod.

10. The apparatus of claim 8, further comprising:
the slide bar having a first bar end and a second bar end;
a first bar bracket disposed on the first bar end, the first bar bracket being attached to the swing arm; and
a second bar bracket disposed on the second bar end, the second bar bracket being attached to the swing arm.

11. The apparatus of claim 10, wherein the first and second bar brackets are each attached to the swing arm using one or more mechanical fasteners.

12. A tire changing apparatus, comprising:
a support tower;
a swing arm pivotally attached to the support tower, the swing arm including a shaft extending from the swing arm, the shaft being vertically moveable relative to the swing arm, the shaft including a tool head positioned on the shaft, the tool head configured to engage a tire or wheel rim;
a support flange extending from the support tower;
a flange plate pivotally attached to the flange, the flange plate defining a flange plate opening; and
a rod having a first rod end attached to the swing arm and a second rod end slidably received in the flange plate opening.

13. The apparatus of claim 12, further comprising:
a releasable rod clamp positioned adjacent the flange plate, the releasable rod clamp threadedly engaging the rod.

* * * * *